(12) United States Patent
Xu et al.

(10) Patent No.: US 6,961,323 B1
(45) Date of Patent: Nov. 1, 2005

(54) GUARANTEED AIR CONNECTION

(75) Inventors: Xiaode Xu, Fremont, CA (US); Wenfeng Huang, Cupertino, CA (US); Ian Sayers, Redwood City, CA (US)

(73) Assignee: Cisco Technologies, Inc., San Jose, CA (US)

( * ) Notice: Subject to any disclaimer, the term of this patent is extended or adjusted under 35 U.S.C. 154(b) by 0 days.

(21) Appl. No.: 09/504,325

(22) Filed: Feb. 14, 2000

(51) Int. Cl.[7] .............................. H04B 1/38; H04Q 7/20; H04Q 7/00
(52) U.S. Cl. ...................... 370/329; 455/450; 455/461; 455/560; 379/204.01
(58) Field of Search ..................... 370/310, 319–322, 370/347–348, 439, 441–443, 329; 455/450, 455/451, 455, 414, 46, 416, 406, 461, 560; 379/88.11, 204.01

(56) References Cited

U.S. PATENT DOCUMENTS

| | | | |
|---|---|---|---|
| 5,278,833 A | 1/1994 | Crisler et al. | 370/95.1 |
| 5,297,144 A | 3/1994 | Gilbert et al. | 370/95.2 |
| 5,574,977 A * | 11/1996 | Joseph et al. | 455/450 |
| 5,619,555 A * | 4/1997 | Fenton et al. | 379/88.11 |
| 5,737,338 A | 4/1998 | Eguchi et al. | 371/20.5 |
| 5,774,535 A | 6/1998 | Castro | 379/144 |
| 5,787,080 A | 7/1998 | Hulyalkar et al. | 370/348 |
| 5,805,581 A | 9/1998 | Uchida et al. | 370/35 |
| 5,884,174 A | 3/1999 | Nagarajan et al. | 455/436 |
| 5,970,056 A * | 10/1999 | Brailean et al. | 370/296 |
| 5,978,363 A * | 11/1999 | Dimitrijevic et al. | 370/319 |
| 6,031,832 A * | 2/2000 | Turina | 370/348 |
| 6,167,261 A * | 12/2000 | Amin | 455/426 |
| 6,263,201 B1 * | 7/2001 | Hashimoto et al. | 455/403 |
| 6,411,803 B1 * | 6/2002 | Malackowski et al. | 455/406 |
| 6,510,322 B1 * | 1/2003 | Schulte-Kellinghaus | 455/450 |
| 6,522,660 B1 * | 2/2003 | Mukaihara et al. | 370/443 |
| 6,529,497 B1 * | 3/2003 | Hjelm et al. | 370/347 |
| 6,539,237 B1 * | 3/2003 | Sayers et al. | 455/555 |

* cited by examiner

*Primary Examiner*—Afsar Qureshi
(74) *Attorney, Agent, or Firm*—Hamilton, Brook, Smith & Reynolds, P.C.

(57) ABSTRACT

A technique whereby a subscriber of a multiple access communication network such as a cellular communication system is permitted to make a reservation to guarantee availability of a shared physical communication resource, such as a cellular radio telephone traffic channel, at an appointed date, time and location. The reservation is made in advance by the subscriber requesting the network to mark a requested resource for the subscribers exclusive use during the requested period of time. The reservation may be made any number of ways, such as through the subscriber terminal itself, by making arrangements themselves or on their behalf by others at a conference call center, through Web servers connected through the Internet, or by other means. Whenever a resource of the requested type is available during the requested period, the controlling stations in the network reserve that resource for that subscribers' exclusive use as the appointed time draws near. Thus, when that subscriber attempts to originate or is expected to receive a call at the appointed time, the network is able to grant the on-hold resource to that subscriber. After the reserved period of time elapses, the network releases the reserved resource, and applies normal allocation rules to it.

30 Claims, 2 Drawing Sheets

GUARANTEED AIR CONNECTION

BACKGROUND OF THE INVENTION

The present invention relates generally to communication systems and in particular to a technique for controlling access to radio channel resources among a number of competing subscriber units.

Multiple access communication systems continue to enjoy wide spread use. Such systems are designed to allow access to limited communication channel resources among a number of different subscriber units. One example of such a system is a cellular telephone system in which a large number of subscribers vie for access to radio channels provided by a limited number of base stations.

The first generation of cellular systems used a multiple access technique known as Frequency Division Multiple Access (FDMA). In such a system, communication resources are considered to be a radio channel of given fixed bandwidth and at a given center carrier frequency. One such a system is the Advanced Mobile Phone Service (AMPS) system which has been widely deployed in the United States. In an AMPS system, access to the communication channels is generally vied for on a demand basis. In other words, channels are provided to users as they switch on their handsets and attempt to make a telephone call. If another user then attempts to place a telephone call and all of the available radio channels are in use, the later user is generally denied access.

Other cellular systems divide the available communication resources in a number of different ways. For example, a noncontention protocol known as Time Division Multiple Access (TDMA) divides the available communication channels into a number of time frames and a number of time slots. Each subscriber unit is then assigned exclusive use of one of the time slots on a given radio channel. This is the basic protocol for radio channel access used by the Global System for Mobile (GSM) communications system widely popularized in Europe.

Another contention-based protocol known as slotted Aloha allows the communication units to actively compete with each other to gain access to the time slots. In this type of system, a subscriber unit desiring to communicate will attempt to transmit in a given time slot which appears to be available. The unit then monitors for a collision. If it detects no other communication subscriber unit attempting also to transmit in that time slot, the system will consider the transmission to be successful. However, if one or more of the subscriber units do collide, all the attempted transmissions are considered to be a failure. In this instance, attempts are made to transmit at a later time, at usually randomly selected time slots.

A further multiple access communication protocol known as Code Division Multiple Access (CDMA) is beginning to be widely deployed in the United States. Using this protocol, individual transmissions are encoded using pseudo-random (PN) and/or orthogonal codes. This permits individual users to transmit at the same time and on the same radio carrier frequency without generating interference with one another. However, the number of active users which may be transmitting at any given time on any given radio channel eventually reaches a noise saturation limit. Therefore, even in CDMA systems, the amount of channel resources must be considered to be limited.

In these cellular communication systems, radio channels are allocated such that they require use of one logical channel exclusively, whether it be defined by the FDMA, TDMA, or CDMA protocols previously described. In general, allocation of the available channels, no matter how they are defined, is contention-based and no preemption is allowed. In other words, the networks do not specifically cater to any particular mobile unit in philosophy when granting access to channels. Rather, requests for access are typically granted in the order in which they are received. While this allocation approach helps maximize the usage of all available resources, it does so at the expense of eliminating the ability to attend to a request from a specific user which may thus otherwise be blocked from network access.

SUMMARY OF THE INVENTION

The mobility provided by cellular communication and similar wireless systems have been found to be very convenient for people who find themselves needing to remain in contact while traveling. However, as such systems become overcrowded, one cannot always expect to gain access at any given time. For example, during busy times of the day such as during rush hour along a crowded highway, users may be denied access to the system. At a minimum, this provides some frustration where the user must attempt to redial a telephone call until a communication channel becomes available. Indeed, most present generation subscriber units have built-in redial features whereby if a call does not go through, the handset itself continues to try the telephone number until it is successful.

However, this solution is only a somewhat satisfying one. In particular, if one is expected to make and/or receive a telephone call at a particular time, contention-based systems still do not provide all the advantages that might otherwise be provided. For example, a busy executive may have a conference call scheduled for a particular time. Now, long distance telephone service providers are quite successful in selling a service whereby a call in toll free number may be used to set up a conference call among a number of participants. Even if the mobile user goes to the trouble of setting up conference calling capability through such a service in advance, if one finds himself having only a mobile telephone available, one cannot be assured of being able to obtain access to a mobile telephone system at the appointed time.

There are other instances in which mobile communication users expect to be able to receive and/or place telephone calls at a particular time.

The present invention is a technique for guaranteeing a subscriber unit access to a system by allowing the subscriber to create a reservation in advance. The reservation is, in effect, a request for the network to mark a shared communication resource, such as a cellular telephone traffic channel, for that subscriber's exclusive use during a requested period of time.

When a resource of the requested type is available for the requested period, as determined by the system, it will be held for that subscribers exclusive use. Meanwhile, if the subscriber attempts to originate a call or a call is received as destined for the subscriber, the network will always grant the on-hold resource to that subscriber. After the reserved period of time elapses, the network releases the reserved resource for use by other units and may otherwise be available for normal allocation. The invention thus guarantees a successful resource allocation to a specific mobile subscriber unit from among channel requests received from a large number of other mobile units in a contention based system.

The reservation may be made in any number of ways, such as through a conference calling center, by entering the information on the mobile handset, through an operator-assisted manual service provided by the cellular carrier, an Internet or Web-based form, or e-mail submission service.

It should be understood that the concept of a shared communication resource may typically include a traffic channel within a cellular telephone system. However, the resource may not only include a radio channel of a particular fixed bandwidth, but may also include reservation of, in a more general sense, bandwidth on a physical medium. For example, the user of an analog cellular telephone can only request reservation of a fixed 30 kHz wide radio channel, for that is the type of communication resource which that sort of system supports. However, in a Wideband Code Division Multiple Access (W-CDMA) system, the user may request the shared resource by requesting bandwidth of a particular amount, say, from a minimum acceptable bandwidth up to a maximum acceptable bandwidth which the user is willing to pay for. The system then reserves the requested bandwidth for the user.

The invention may be implemented and provided as a service feature in public cellular telephone networks and/or enterprise wide voice data networks including other types of wireless networks or even wire line networks such as Private Branch Exchange (PBX) based networks or satellite networks. The feature can be used in any system where a subscriber knows in advance that they will need access to a contention based system at a certain period of time, such as when expecting to join a conference call, or when expecting to receive a call at a known time.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
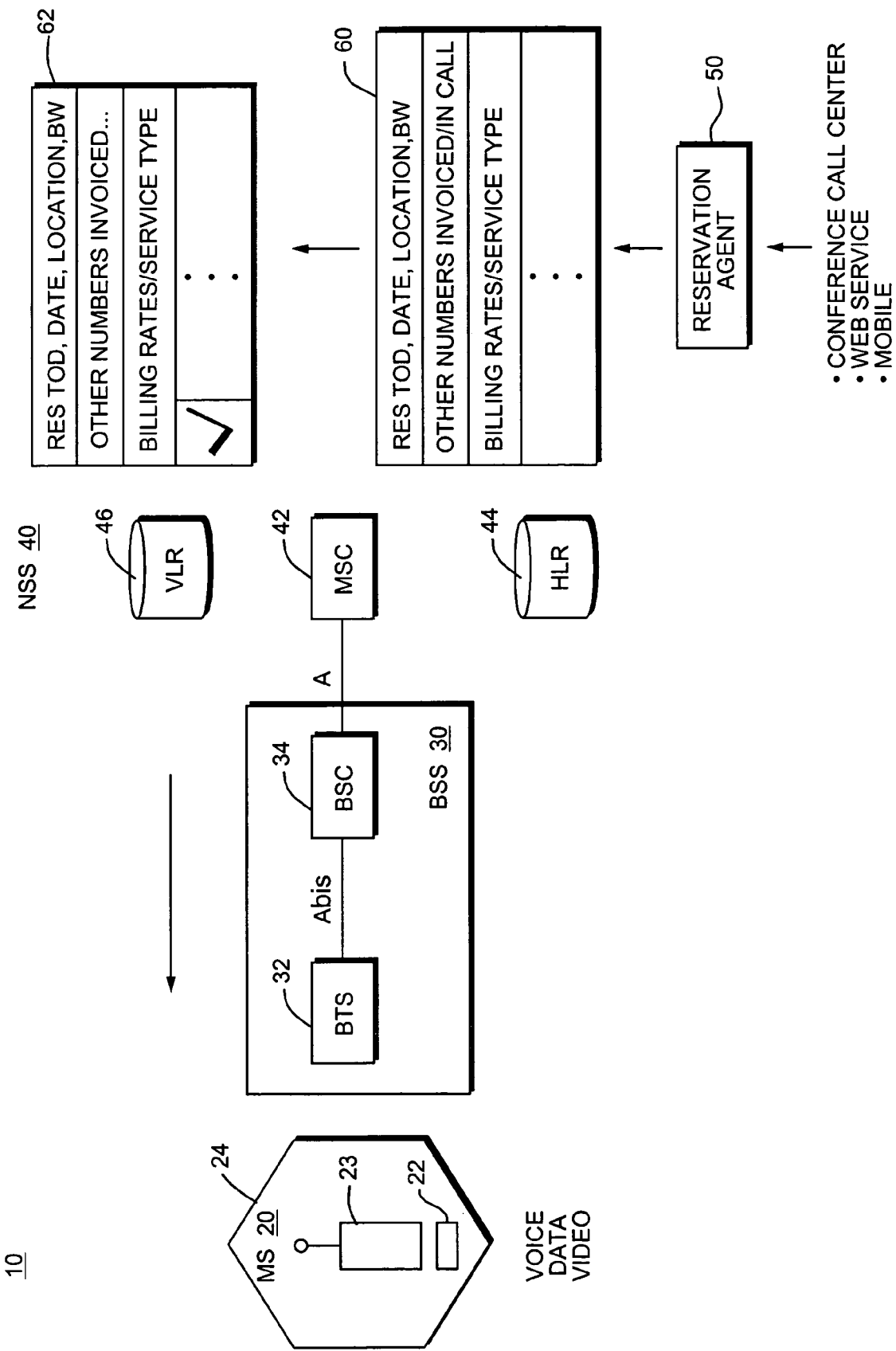
FIG. 1 is a block diagram of a cellular communication system in which the invention may be deployed.

Turning attention to FIG. 1, an implementation of the present invention will be discussed principally in the context of a Global System for Mobile Communications (GSM) type cellular system. It should be understood however, that the concept of advance reservation of communication resources according to the invention can also be applied to other types of wireless networks, such as Code Division Multiple Access (CDMA), satellite networks, wireline networks, or any other communication network in which a user must vie for access to physical media.

The functional architecture of a GSM system 10 can be broadly divided into subsystems including a mobile station (MS) 20, a Base Station Subsystem (BSS) 30, and a Network Sub-System (NSS) 40. Each subsystem is comprised of functional entities which communicate through various interfaces using protocols specified by the GSM standard.

The mobile station 20 in GSM is really two distinct entities. The actual hardware is the mobile equipment, which is the equipment which the subscriber or user carries. Subscriber information, which includes a unique identifier called the International Mobile Subscriber Identity (IMSI), is stored in a Subscriber Identity Module (SIM) 22, typically implemented as a smart card. By inserting the SIM card 22 in any GSM mobile equipment 23, a user is able to make and receive calls at that terminal and receive other services to which the user has subscribed. By decoupling subscriber information from a specific terminal 23, greater personal mobility is provided to GSM users than for other wireless systems.

The Base Station Subsystem (BSS) 30 is composed of two parts, the Base Transceiver Station (BTS) 32 and the Base Station Controller (BSC) 34. The BTS 32 houses radio transceivers that define a cell and handles the radio (Um) interface protocols with the mobile station 30. Due to the potentially large number of BTSs 32 in a system 10, the requirements for a BTS 32 are ruggedness, reliability, portability, and minimum cost.

The Base Station Controller (BSC) 34 manages radio resources for one or more BTSs 32, across the Abis interface. It manages the radio interface channels (setup, tear down, frequency hopping, etc.) as well as handovers.

A central component of the Network Sub-System 40 is the Mobile Switching Center (MSC) 42. It acts like a normal switching node of a Public Switched Telephone Network (PSTN) or Integrated Services Digital Network (ISDN). In addition, the MSC 42 provides all the functionality needed to handle a mobile subscriber, including registration, authentication, location updating, inter-MSC 42 handovers, and call routing to roaming subscribers. These services are provided in conjunction with four intelligent databases, which together with the MSC 42 form the Network Sub-System (NSS) 40. The MSC 42 also provides connections to the public wireline terrestrial networks.

While the network side of the system, including the BTS, BSC, and MSC are suggested as encompassing different physical machines in FIG. 1, it should be understood that they may all be implemented in the same physical hardware so that physical layer interfaces Abis and A are not required.

The Home Location Register (HLR) 44 is a database which contains administrative information for each subscriber registered in the corresponding GSM network 10, along with the current location of the subscriber. The location information assists in routing incoming calls to the mobile station 20, and is typically the Signalling System 7 (SS7) address of the visited MSC 42. There is logically one HLR 44 per GSM network 10, although it may be implemented as a distributed database. The Visitor Location Register (VLR) 46 contains selected administrative information from the HLR, necessary for call control and provision of the subscribed services, for each mobile currently located in the geographical area controlled by the VLR 46. Although the VLR 46 can be implemented as an independent unit, most manufacturers of switching equipment implement the VLR 46 together with the MSC 42 so that the geographical area controlled by the MSC 42 corresponds to that controlled by the VLR 46. The proximity of the VLR 46 to the MSC 42 speeds up access to information that the MSC 42 requires during a call.

Referring now to features of the system 10 which are more specific to the present invention, a reservation agent 50 is responsible for receiving and managing requests for advanced reservation of access to the network 10. In particular, the reservation agent 50 receives information concerning the need for a particular subscriber mobile station 20 to access the system 10 at a particular date and time.

The reservation agent 50 may accept other information such as the expected location of the mobile station 20, the desired amount of bandwidth (e.g., standard voice channel, a wire data channel and/or video type access). In addition, other information may be accepted by the reservation agent 50 such as other telephone numbers involved in a conference call, the billing rates to be applied for providing the special service and/or service type information.

The reservation agent 50 may be physically implemented in a number of different ways. In a first scenario, the reservation agent 50 is associated with a conference call center. Thus, when the conference call operator accepts a reservation for making a future conference call, a reservation record 60 is created at the time. The conference call center computer thus creates the record 60 passing it along to the reservation agent 50, which in turn causes the record 60 to be created in a home location register (HLR) 44.

In another scenario, a Web-based service provides the information needed to create the reservation records 60. In particular, the operator of the system 10 may maintain a Web site at which a form may be filled out by authorized users of the mobile stations 22 to indicate that they wish to reserve access to the system 10 at a particular time, date and location. Other information needed to complete the reservation record 60 can also be entered through the Web page service. Once obtaining the required information, the Web server sends the completed reservation record 60 to the reservation agent 50 which again in turn places it in the HLR 44 record associated with the particular mobile station 20.

In an analogous way, e-mail messages can also be used to create the reservation record 60.

In yet another scenario, the subscriber may make use of the mobile station 20 to create the reservation record 60. In particular, using the mobile station 20, the user may dial special telephone numbers set up by the operator of the system 10 on the keypad of the mobile equipment 23. Equipment connected to answer the special telephone numbers may in turn allow the user of the mobile station 20 to create and send data through the BSS 30 to the MSC 42 to create the reservation record 60. In such an instance, the MSC 42 will indicate to the HLR 44 that the reservation record 60 is to be maintained with the user's HLR database entry. The user could, for example, use an Unstructured Supplementary Services Data (USSD) method to set up the reservation. For example, the user could enter a command string on their mobile equipment 23 such as *1212991500201xx to request a reservation on Dec. 12, 1999 at 15:00 hours for 20 minutes on one (1) channel.

Figure 2:
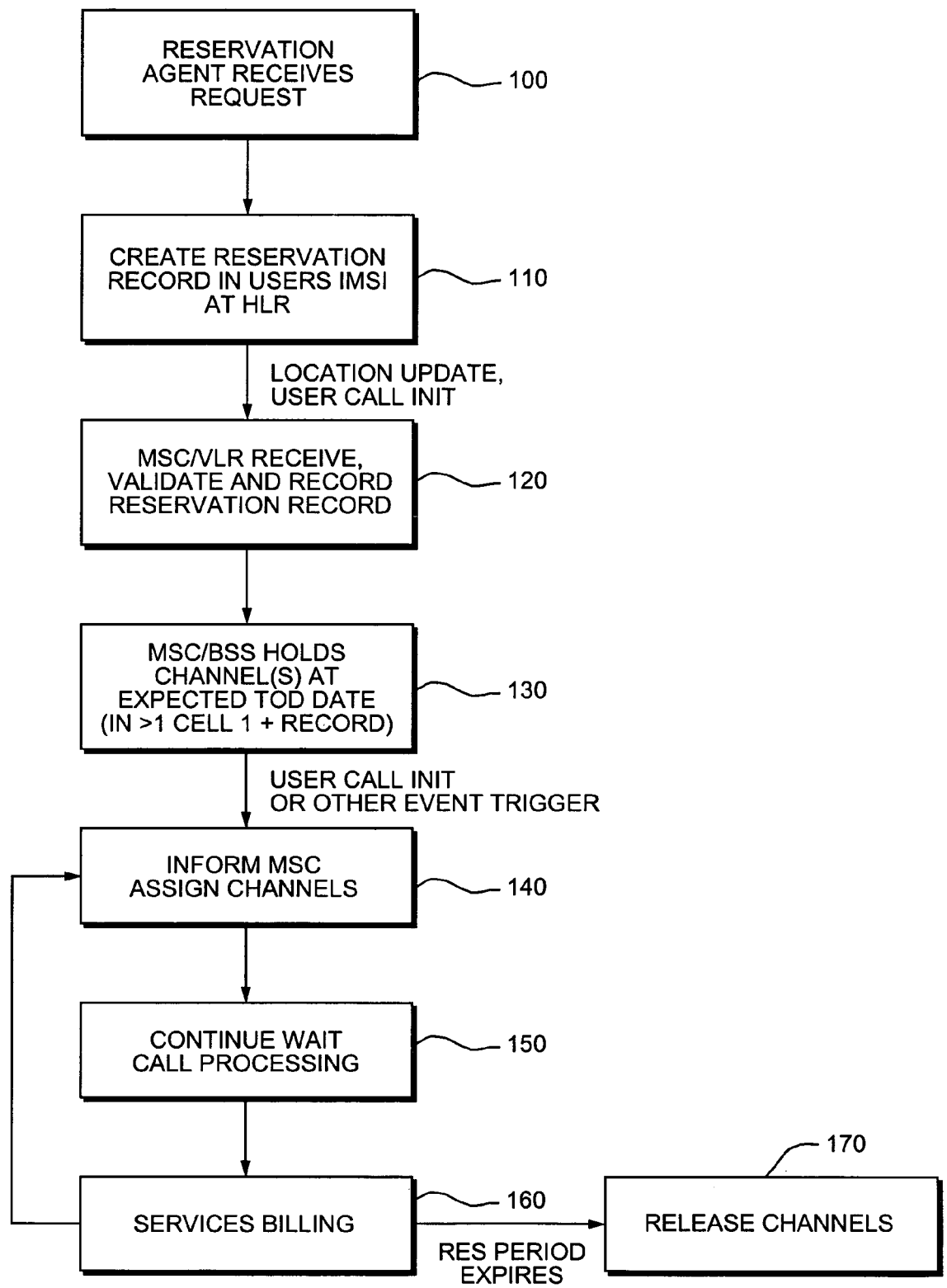
FIG. 2 is a flow diagram of the steps performed by the system in order to implement the invention.

Detailed steps showing a process which the system 10 may use to provide the reservation service to the mobile subscriber 20 are shown in FIG. 2.

In a first step 100, the reservation agent 50 receives the request for a reservation in the manner just described.

In a next step 110, a reservation record 60 is caused to be stored in the HLR 44. This would typically be associated with the IMSI record associated with a particular subscriber in that subscriber's HLR 44.

Upon the occurrence of an appropriate event, such as a location update event and/or the user of the mobile station 20, attempting to initiate a call, the MSC 42 reads the reservation records 60 from the HLR 44. (The reservation data could also be sent autonomously to the MSC/VLR serving the user via an insert subscriber data operation). The MSC 42 will then perform a validation on the user. To validate the user's access, the MSC 42 will check the contents of the reservation record 60 such as the location, billing rates and other information needed to validate that the user of the mobile station 20 is permitted to make a call. The validated reservation record 62, having a validation bit now set, is stored in a visitor location register (VLR) 46 associated with the cell site 24 in which the mobile station 20 is located.

In a next step 130, the MSC 42 and BSS 30 thus cause the required amount of channel resources to be held for the exclusive use of the subscriber identified in the validated reservation record 62 at the expected time of day and date and location. For example, the MSC 42 may have a running process or thread which periodically scans the reservation records 62 located in the VLR 46. Upon discovery of a reservation record that matches a time of day and date that is about to take place, the MSC 42 will instruct the BSS 30 and in particular the BTS 32 associated with the expected location of the mobile subscriber 20, to maintain the indicated number of channels necessary to support the desired service type, as indicated in the validated reservation record 62.

Upon the occurrence of the user initiating a call, a next step 140 is entered in which the MSC 42 is informed of the user's request for radio channels. Upon noting that the user has a reserved channel available, the MSC 42 will then instruct the BSC 34, and in particular the BTS 32, to assign the reserved channel to the mobile station 20.

In step 150, call processing continues as normal with the user being permitted to receive and/or place calls during the reservation period.

Finally, in a final step 160, services billing information may be sent through the MSC to insure that the user is charged for any premium which might be imposed by the operator of the system 10 for this reservation service.

The call then progresses normally in step 170 until termination of the call. At this point, the channel(s) which were previously reserved for the exclusive use of the indicated mobile station 20 are now freed for use by other subscribers.

In the meantime, even if a call ends, the user may reenter a state 140 upon wishing to place yet other calls, as long as the reserved time limit is not yet expired. In another scenario, if the user does not attempt to place a call, or does not receive a call, within a specified time after the reservation time begins, the system may deallocate the reserved resources. In a similar vein, rather than automatically terminate the call at the expiration of the reserved time limit, the user may be prompted to hear a warning as the time limit draws near, or be prompted to extend the call provided that resources are available.

Still other types of events may trigger the initiation of the reservation in step 100. For example, the present invention is also applicable to a situation where the reserving party received a terminated call in the allocated time from one of the named entities in the originating call reservation. For example, one party may make a reservation for another party, and the party who makes the reservation may initiate the call by calling the second party. In this instance, the first party may have access to a wireline telephone and makes a reservation for the second party, who is expected to be available only by mobile phone. In this instance, when the call is attempted to be initiated by the first wireline user, the steps of assigning the channels for the second mobile user (e.g., steps 130 through 140) are then entered in order to activate the reservation.

The details of the implementation of the allocation step 130 may not necessarily imply the reservation of a fixed "channel" in the sense of a radio channel. Specifically, the nature of the communication resource reserved may depend upon the specific nature of the physical layer communications resources to be reserved. In a GSM system, the resource being reserved is a 200 kHz wide digitally modulated channel. However, in other systems the available resources may be defined in other ways. For example, in a Broadband Code Division Multiple Access (B-CDMA) system, the communication resource request may specify a particular bandwidth, or number of channels, being requested by the user. This may include a minimum acceptable bandwidth which the user is requested, up to a maximum allowable bandwidth. These minimum acceptable and maximum allowable bandwidth specifications can be negotiated during registration of the reservation request. There exact values could depend upon a number of factors, such as how much the user is willing to pay for the service, the limitations of the network, and the like.

In addition, it is possible that the system can take other steps to avoid having the users who request reservations monopolize the available resources. For example, the allocation step 130 can also attempt to allow a predetermined number of users access to the system at their minimum acceptable bandwidth until a point is reached where no more users are allowed to perform registration on the system for that particular location. This results in a system that can accommodate the reservation requests up to a maximum number of requesting users, after which further request are refused.

In addition, the channel allocation step 130 may involve other considerations with respect to the expected mobility of the mobile telephone equipment. For example, the system may plan in advance for the likely event of a need for handover of a call, or simply camping on a new cell, through cell re-selection or via Location Update Procedures as a user moves from one cell to another cell during the reservation time. A number of different approaches can be taken towards this end.

In a first scenario, the call in progress may be changed from a full rate call to a half-rate call during the handover process. While this might reduce the speech quality of the call in progress, it at least allows the call to continue.

In a second scenario, forced handovers of other candidate users in the new congested cell may be implemented to allow the reservation handover to have access to communication resources in the new cell.

In a third scenario, a directed retry technique may be used when the user makes the call or receives the call. In particular, this approach allows the network to select an optimum cell within the user's area. This decision may be based upon received power and congestion level determinations at the time the call is initiated. Thus, for example, if the user is on an edge of a congested cell but can be serviced by an adjacent cell which is less congested, the call can be directed to the less congested cell.

In a fourth scenario, if a data call is involved in the reservation, then it might be possible to drop the data rate down to other than what was originally established for the call. For example, if the calls started in an initial cell at a requested maximum speed, then the handover may take place to a more congested cell with the understanding that the call would continue at a lower data rate.

Both the first and fourth scenarios may require the introduction of a network policy for either accomplishing such results or permitting the user to a grade advance to an expected quality of service when the reservation is made.

In a fifth scenario, it would be possible to potentially reserve bandwidth on cells lying along an expected path or route that the user is expected to be traveling along at the reserved time and date. In this instance, the location of the call is not specified as a particular fixed location in step 110, but rather a route consisting of an expected starting and expected ending destination. The system 10 then attempts in step 130 to reserve bandwidth or other communication resources in each of a number of cells lying along the expected route such as in step 130. This then allows the soft handover processing to occur for users in adjacent cells as the user moves along. This may also be of benefit even when the user is not moving along in systems which implement Code Division Multiple Access (CDMA). In such instances, it is possible to achieve soft handovers for users moving around a domain if channels are available in cells adjacent to the originally reserved cell location.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of operating a contention-based, multiple access communication system comprising the steps of:
   accepting a reservation request for access by a user to a shared communication resource, the reservation request indicating at least a future appointed time for the reservation;
   creating a reservation record in a home location register, the reservation record associated with the user;
   prior to the future appointed reservation time, reading the reservation record from the home location register;
   validating the reservation record for access if the user is authorized;
   moving the validated reservation record to a visitor location register; and
   at the appointed reservation time,
   reserving at least a portion of the shared communication resource for exclusive use by the user.

2. A method as in claim 1 wherein the reservation request specifies a desired bandwidth for the shared communication resource.

3. A method as in claim 1 wherein the reservation request additionally specifies a physical location for the shared communication resource.

4. A method as in claim 1 wherein the reservation request additionally specifies a call duration for the shared communication resource.

5. A method as in claim 4 comprising the additional step of:
   releasing the reserved communication resource once the call duration specified by the reservation request has expired.

6. A method as in claim 4 comprising the additional step of:
   near the end of the call duration, sending a warning prompt to the user that the call is about to be terminated.

7. A method as in claim 4 additionally comprising the step of:
   near the end of the call duration, prompting the user to request whether the call duration should be extended.

8. A method as in claim 4 wherein the reservation record additionally specifies a billing rate for the reservation request.

9. A method as in claim 1 comprising the additional step of:
　　releasing the communication resource if the user does not attempt to access the communication resource within a predetermined time after the reservation time.

10. A method as in claim 1 wherein the shared communication resource is a radio channel in a wireless communication system.

11. A method as in claim 1 wherein the reservation record additionally specifies telephone numbers for other users to be connected at the reservation time.

12. A method as in claim 1 wherein the reservation request is made for the user by another party who will participate in communicating with the user at the reservation time.

13. A method as in claim 1 wherein the wireless communication system is a cellular system, and the method further comprises the additional steps of:
　　accepting a reservation request indicating an expected physical location for the user at the reservation time; and
　　reserving a communication resource in one or more cells in an area near the expected physical location.

14. A method as in claim 1 wherein the wireless communication system is a cellular system, and the method further comprises the additional steps of:
　　accepting a reservation request indicating an expected physical location and expected route for the user at the reservation time; and
　　reserving a communication resource in one or more cells located along the expected route.

15. A computer readable medium having computer readable program codes embodied therein for causing at least one computer to operate a contention-based, multiple access communication system, the computer readable medium program codes performing functions comprising:
　　accepting a reservation request for access by a user to a shared communication resource, the reservation request indicating at least a future appointed time for the reservation;
　　creating a reservation record in a home location register, the reservation record associated with the user;
　　prior to the reservation time, reading the reservation record from the home location register;
　　validating the reservation record for access if the user is authorized;
　　moving the validated reservation record to a visitor location register; and
　　at the reservation time, reserving at least a portion of the shared communication resource for exclusive use by the user.

16. A mobile switching apparatus in a wireless communications network, the wireless network including one or more home location registers, visited location registers, base station subsystems, reservation agents, and mobile stations, each mobile station interfacing with a subscriber identity module, each subscriber identity module including the identity for a wireless network subscriber, the apparatus comprising:
　　a first interface with a home location register, the home location register capable of storing a reservation record received from a reservation agent, the reservation record associated with a subscriber;
　　a second interface with a visited location register, the visited location register capable of storing a temporary reservation record associated with a subscriber;
　　a third interface with a base station subsystem, the base station subsystem managing the radio interface channels accessed by mobile stations;
　　means for reading the reservation record from the home location register prior to the reservation time;
　　means for validating the reservation record for access if the user is authorized;
　　means for moving the validated reservation record to a visitor location register; and
　　means for reserving one or more interface channels for exclusive use by the mobile station associated with a subscriber at the reservation time.

17. A contention-based, multiple access communication system comprising:
　　means for accepting a reservation request for access by a user to a shared communication resource, the reservation request indicating at least a future appointed time for the reservation;
　　means for creating a reservation record in a home location register, the reservation record associated with the user;
　　means for reading the reservation record from the home location register prior to the reservation time;
　　means for validating the reservation record for access if the user is authorized;
　　means for moving the validated reservation record to a visitor location register; and
　　means for reserving at least a portion of the shared communication resource for exclusive use by the user at the reservation time.

18. A system as in claim 17 wherein the reservation request specifies a desired bandwidth for the shared communication resource.

19. A system as in claim 17 wherein the reservation request additionally specifies a physical location for the shared communication resource.

20. A system as in claim 17 wherein the reservation request additionally specifies a call duration for the shared communication resource.

21. A system as in claim 20 comprising the additional means for releasing the reserved communication resource once the call duration specified by the reservation request has expired.

22. A system as in claim 20 comprising the additional means for sending a warning prompt to the user that the call is about to be terminated near the end of the call duration.

23. A system as in claim 20 additionally comprising the means for prompting the user to request whether the call duration should be extended near the end of the call duration.

24. A system as in claim 20 wherein the reservation record additionally specifies a billing rate for the reservation request.

25. A system as in claim 17 further comprising the means for releasing the communication resource if the user does not attempt to access the communication resource within a predetermined time after the reservation time.

26. A system as in claim 17 wherein the shared communication resource is a radio channel in a wireless communication system.

27. A system as in claim 17 wherein the reservation record additionally specifies telephone numbers for other users to be connected at the reservation time.

28. A system as in claim 17 wherein the reservation request is made for the user by another party who will participate in communicating with the user at the appointed date and time.

29. A system as in claim 17 wherein the wireless communication system is a cellular system, and further comprises:
  means for accepting a reservation request indicating an expected physical location for the user at the appointed date and time; and
  means for reserving a communication resource in one or more cells in an area near the expected physical location.

30. A system as in claim 17 wherein the wireless communication system is a cellular system, and further comprises:
  means for accepting a reservation request indicating an expected physical location and expected route for the user at the reservation time; and
  means for reserving a communication resource in one or more cells located along the expected route.

* * * * *